United States Patent [19]
Adams et al.
[11] 3,870,837
[45] Mar. 11, 1975

[54] TELEPHONE RINGER COUNTER

[75] Inventors: John William Adams, Jamestown; Ihsan Mustafa Hasan Babaa, Greensboro; Donald Larry Hester, Kernersville, all of N.C.

[73] Assignee: Bell Telephone Laboratories Incorporated, Murray Hill, N.J.

[22] Filed: Feb. 15, 1974

[21] Appl. No.: 443,129

[52] U.S. Cl. ......... 179/175.2 B, 179/175, 324/61 R
[51] Int. Cl. ......... H04m 1/24
[58] Field of Search ...... 179/175.2 B, 175, 175.1 R, 179/175.3 R; 324/60 R, 61 R

[56] References Cited
UNITED STATES PATENTS
3,185,781 5/1965 Lueft et al. ......... 179/175

*Primary Examiner*—Kathleen H. Claffy
*Assistant Examiner*—Douglas W. Olms
*Attorney, Agent, or Firm*—J. S. Cubert

[57] ABSTRACT

An arrangement for counting the number of ringing devices on a subscriber loop based on measurement of the ringing device capacitance includes the application of below-resonance and above-resonance frequency signals to measure the loop admittance. The resulting loop current contains a below-resonance component corresponding to the sum of the loop capacitances and the ringer capacitance and an above-resonance component corresponding to the loop capacitance. Subtraction of a DC signal derived from the above-resonance component from a DC signal derived from the below-resonance component results in a signal proportional to the number of ringing devices connected to the loop.

9 Claims, 3 Drawing Figures

TELEPHONE RINGER COUNTER

Our invention relates to communication line testing arrangements and more particularly to a method and apparatus for testing telephone subscriber lines with signaling devices attached thereto.

In telephone and other communication systems, a subscriber loop may connect one or more subscriber sets to a switching office. Each subscriber set includes a signaling device operative to signal a particular subscriber when a call is directed to him. The signaling device is generally a ringing device operative to provide an audible signal to alert the subscriber. The number of ringing devices on a subscriber loop corresponds to the number of subscriber sets connected to the loop. It is often necessary to test the loop to determine the number of ringing devices connected thereto. This may be done to ascertain the signaling load on the loop or to detect the existence of unauthorized extensions connected to the loop. Generally, the ringing device includes a resonance circuit selectively responsive to a low frequency signal, which resonance circuit drives mechanical sound-producing apparatus.

One method of checking the number of ringers on a loop includes the application of the signaling frequency to the loop in series with a predetermined resistor. Each ringer at resonance has a characteristic resistance whereby the signaling voltage across the predetermined resistance in series with the loop is approximately proportional to the number of ringing devices connected across the loop. The resistance of each ringer at resonance, however, depends on the Q of the ringer resonance circuit, which Q varies widely from ringer to ringer. Further, the resistance of the loop is a function of its length and the wire size used. The resistance of the loop will vary in accordance with its characteristics and the variation in resistance tends to mask the measurement of ringer characteristic resistance. Additionally, if a test trunk is connected to the loop so that the test may be conducted from a convenient point in the communication system, the added resistance of the test trunk further masks the measurement of the ringer resistance.

It is an object of the invention to provide an improved system for determining the number of signaling devices connected to a communications line.

It is another object of the invention to provide detection of the existence of unauthorized extensions on a subscriber loop.

It is a further object of the invention to provide for the determination of the number of ringing devices connected to a subscriber loop, said determination being substantially independent of the subscriber loop length.

It is yet a further object of the invention to provide for the determination of the number of ringing devices on a subscriber loop based on the capacitance characteristics of the ringing device.

BRIEF SUMMARY OF THE INVENTION

The invention is a signaling device counting arrangement operative to determine the number of signaling ringing devices connected to a communication loop. First and second frequency signals are applied to a communication loop. Each ringing device has a resonant frequency intermediate said first and second frequencies connected thereto. The resulting loop current is detected and the first and second frequency components thereof are separated. A first resultant signal corresponding to the first frequency current is derived and a second resultant signal corresponding to the second frequency current is also derived. The difference between the first and second resultant signals is obtained which difference corresponds to the number of ringing devices on the communication loop.

According to one aspect of the invention, first and second frequency generators are coupled to the communication loop, said first frequency being lower than the ringing device resonant frequency and said second frequency being higher than the ringing device resonance frequency. The current resulting from the coupled first and second signals is obtained from a current sensing device in series with the loop. The first frequency current is a measure of the capacitance of the loop and the capacitance of the ringers connected thereto since the admittance of the ringers is capacitive below resonance. The second frequency current is a measure of the loop capacitance only since the ringer admittance well above resonance is small compared to the loop admittance. A first filter connected to the current sensing device responsive to the first frequency current provides an output corresponding to the loop capacitance and the sum of the ringer capacitances; and a second filter connected to the current sensing device responsive to the second frequency current provides an output corresponding to the loop capacitance. The first filter output is passed through an AC to DC converter and applied to one input of a difference circuit. The second filter output is passed through an AC to DC converter and a scaler circuit and is applied to the other input of the difference circuit. The output of the difference circuit corresponds to the total ringer capacitance which is proportional to the number of ringers connected to the loop. Advantageously, the subject invention eliminates the effect of loop length on the ringer measurement. Further, the ringer capacitance is a relatively invariant characteristic whereby an accurate determination of the number of ringers can be obtained.

According to another aspect of the invention, a third higher than resonance frequency generator is also coupled to the communication loop together with the first and second frequency generators to extend the range of loop length over which the subject measurement arrangement is useful. It has been observed that a low above-resonance frequency is particularly useful for longer loops and that a higher above-resonance frequency is particularly useful for shorter loops. The current sensing device output is separated into first, second, and third frequency components by filter circuits. The filter output of the highest (third) frequency component is monitored in a threshold detector. Where the predetermined threshold is exceeded, the second frequency rectified and filtered output is applied to the difference circuit. Otherwise, the third frequency rectified and filtered output is applied to the difference circuit. In this manner, the accuracy of the measurements is maintained over an extended range of loop length.

DETAILED DESCRIPTION

Figure 1:
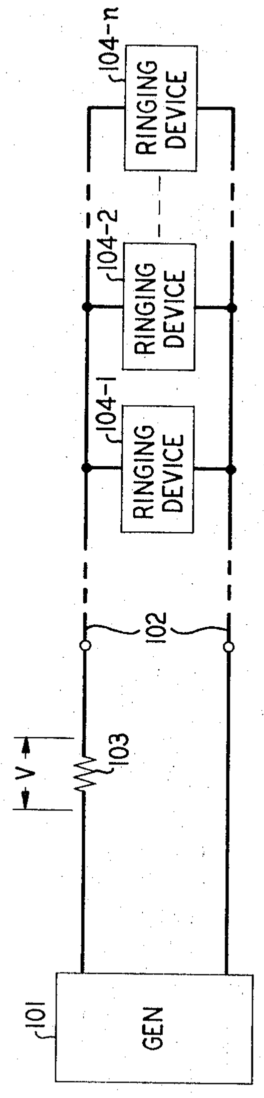
FIG. 1 PRIOR ART
FIG. 1 depicts a prior art arrangement for determining the number of ringer signaling devices on a communication loop.

FIG. 1 shows a prior art arrangement used to determine the number of ringing devices on a subscriber loop. The circuit of FIG. 1 includes signal generator 101, resistor 103, subscriber loop 102, and subscriber ringing devices 104-l through 104-N. Each ringing device includes a series resonant circuit having a predetermined resonant frequency connected across loop 102. Generator 101 applies a voltage at the ringer resonant frequency to loop 102 via resistor 103. The loop current is determined by the parallel resistances of the ringing devices 104-l through 104-N connected to the loop. The current through resistor 103 is proportional to the number of ringing devices connected to the loop whereby a measurement of the voltage across resistor 103 provides an indication of the number of ringers connected to the loop. The resistance of the subscriber loop, however, is connected in series with the ringing devices. Since the loop length and the loop resistance vary from loop to loop, the resulting variation in resistance varies the voltage obtained across resistor 103 so that the measurement of the number of ringers becomes inaccurate. More important, the resistance of the loop reduces the difference in loop current obtained when additional ringers are added to the loop. Further, the resistance measurement is performed at the resonance frequency of the ringer device, but the resistance of the ringer device at resonance varies widely from unit to unit. This variation of resistance further contributes to the inaccuracy of the measurement technique.

Figure 2:
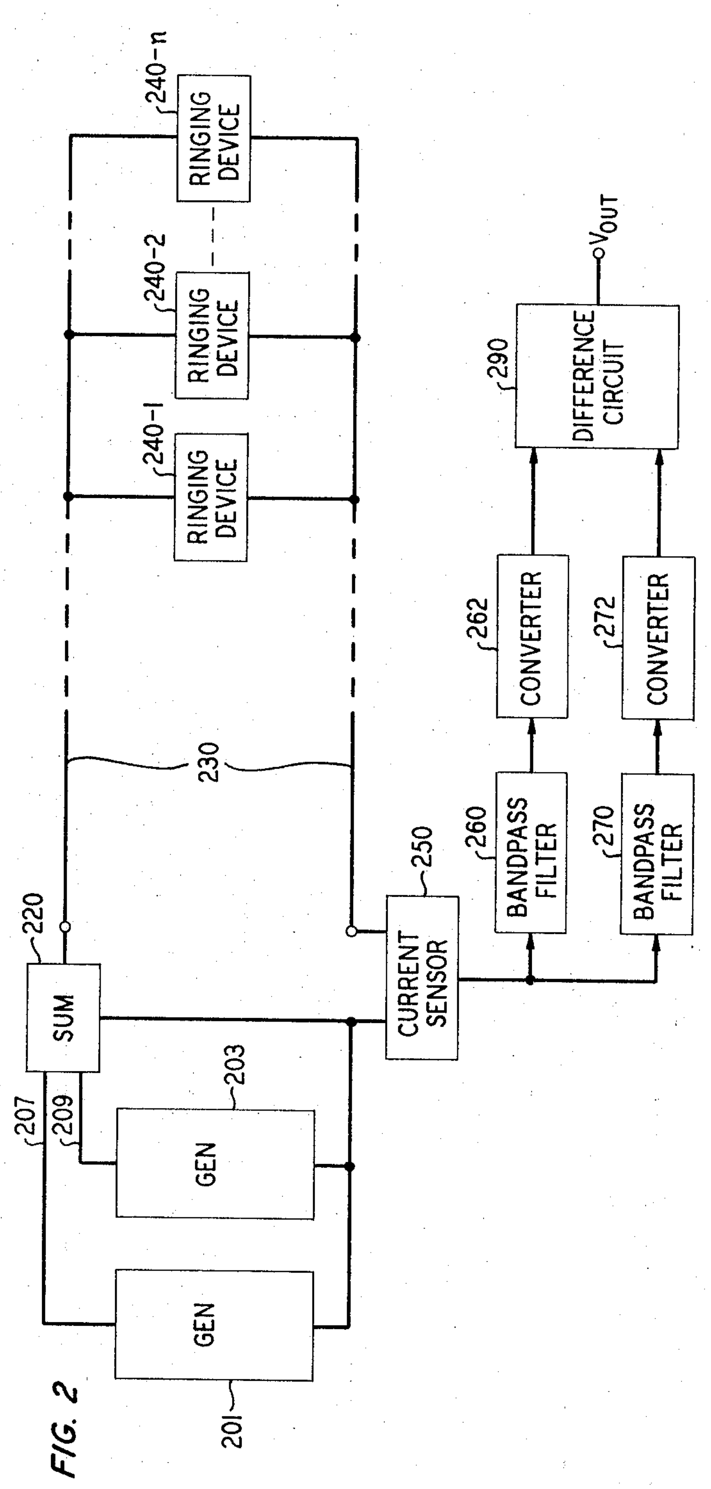
FIG. 2 depicts a schematic diagram of an embodiment illustrative of the invention wherein a below-resonance frequency generator and an above-resonance frequency generator are used.

FIG. 2 shows an embodiment illustrative of the invention wherein the capacitance of the ringing devices connected to the loop and the capacitance of the loop are measured. Since the capacitance of each ringing device is known and relatively little variation is found from unit to unit, a more accurate ringer count can be obtained. In FIG. 2, generator 201 provides a first frequency signal, which frequency is selected to be well below the resonance frequency of the resonant circuit of the ringing device. As is well known in the art, the admittance of the series resonance circuit of the ringing device at frequencies below resonance is predominantly capacitive so that the admittance of the loop provides a measure of the total ringer capacitance and the loop capacitance. Generator 203 provides a signal having a frequency well above the resonance frequency of the resonance circuit of the ringing device. At frequencies well above resonance, the capacitive component of the resonance circuit admittance is relatively low compared to the loop admittance so that the admittance measured substantially represents the capacitance of the loop. The admittance at a frequency well below resonance may be expressed as $$|Y_L| \approx \omega_L\, n\, C_r + \omega_L\, C \cdot d \tag{1}$$

where $\omega_L = 2\pi f_L$ $C_r$ = capacitance of one ringing device $C$ = capacitance per unit length of loop cable $d$ = length of loop cable $n$ = number of ringing devices.

This admittance is substantially a measure of the capacitance of the loop and the total capacitance of the ringing device connected across the loop. The admittance measured across the loop at a frequency well above resonance $$|Y_h| \approx \omega_h\, C \cdot d \tag{2}$$

where $\omega_h = 2\pi f_h$ $C$ = capacitance per unit length of loop cable $d$ = length of loop cable.

This admittance is substantially the admittance of the loop only. Combining Equations (1) and (2)

$$n \approx [\,|Y_L| - (\omega_L/\omega_h)\,|Y_h|\,]/\omega_L C_r \tag{3}$$

Thus, the result obtained from a measurement of the difference between $|Y_L|$ and $|Y_h|$ is proportional to the number of ringing devices across the loop. The two-frequency arrangement advantageously cancels the effect of loop capacitance whereby the total capacitance of the ringers is obtained. Since the ringer capacitance is a relatively fixed characteristic, an accurate determination of the number of ringers on the loop may be derived.

Referring to FIG. 2, the output of below-resonance frequency generator 201 is applied to summing circuit 220 via lead 207. The output of above-resonance frequency generator circuit 203 is applied to summing circuit 220 via lead 209. The sum of high and low frequency signals at the output of summing circuit 220 is applied to loop 230. At the other end of loop 230, subscriber ringing devices 240-1 and 240-2 through 240-N are connected. Current sensor 250 is connected in series with the loop. The output of current sensor 250 thus provides a measure of the admittance of the loop and the connected ringing devices. The admittance at the below-resonance frequency corresponds to the sum of the loop capacitance and the sum of the ringer capacitance. The admittance at the above-resonance frequency corresponds to the capacitance of the loop.

Bandpass filter 270, which may comprise any of the well-known bandpass filter circuits available, operates to pass the below-resonance frequency component of the current sensor output while rejecting the above-resonance frequency component. In similar manner, bandpass filter 260 passes the above-resonance frequency component of the output from current sensor 250 and rejects the below-resonance frequency component. The output of bandpass filter 270 is applied to converter circuit 272 which converts the below-resonance frequency output of filter 270 to a DC signal proportional thereto. Similarly, converter 262 provides a DC signal proportional to the above-resonance frequency output of bandpass filter 260. The DC signal from converter 262 may be appropriately scaled to conform to Equation (3).

The outputs of converter 262 and converter 272 are applied to difference circuit 290, which may comprise an operational amplifier well known in the art. Difference circuit 290 operates to subtract the DC signal derived from the high frequency output of converter 262 from the DC voltage derived from the low frequency output of converter 272. The resultant obtained from the difference circuit is proportional to the number of ringing devices connected across subscriber loop 230.

In the aforementioned testing circuit, the loop capacitance is cancelled in subtracting circuit 290 so that the determination of the number of ringing devices is substantially independent of the loop length. Thus, the testing apparatus, including generators 201 and 203, summing circuit 220, and current sensor 250, may be located at a convenient point in the communication network, the selection of which point does not affect the measurement result.

Figure 3:
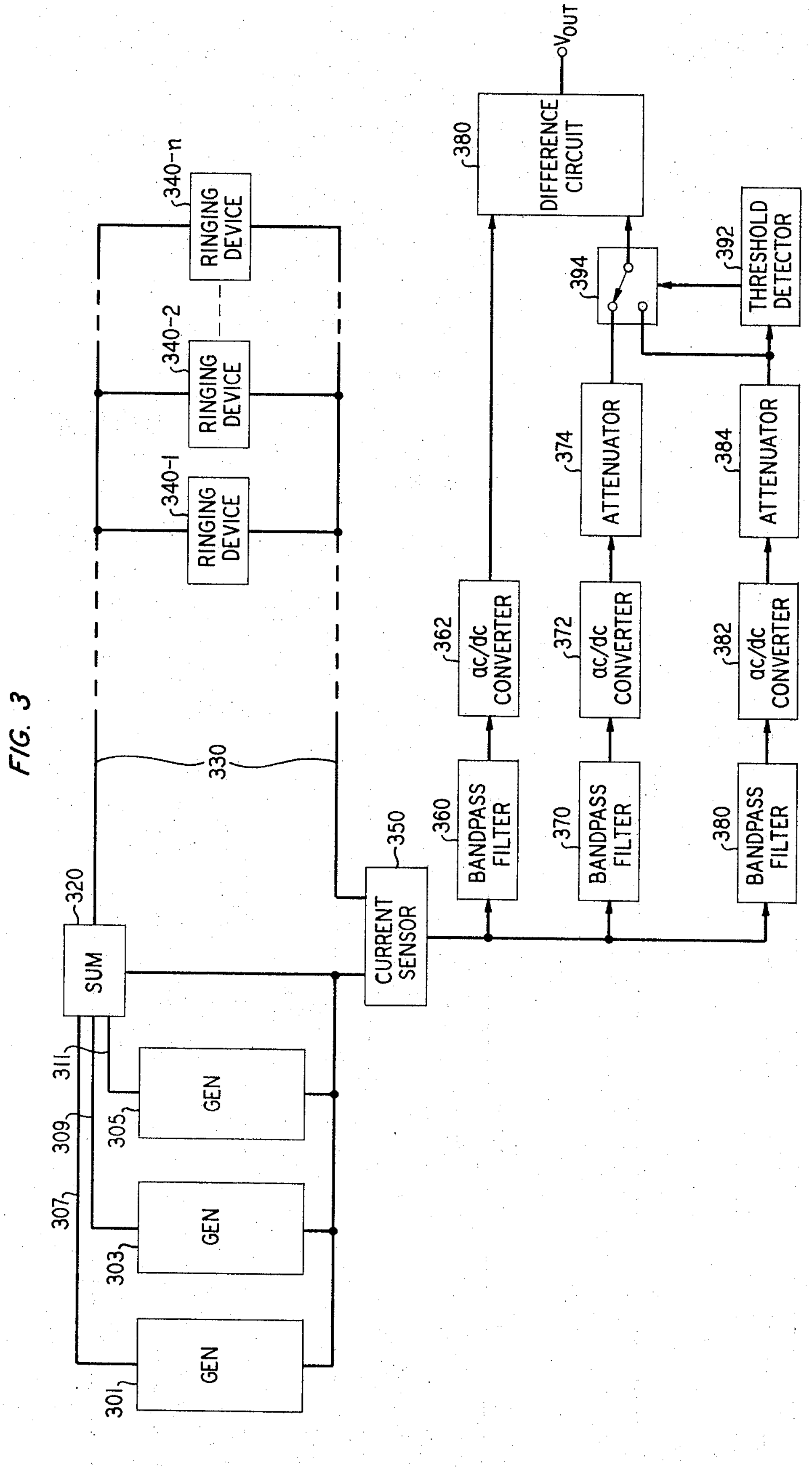
FIG. 3 depicts a schematic diagram of another embodiment illustrative of the invention wherein a below-resonance frequency generator and two above-resonance frequency generators are used.

The circuit of FIG. 3 shows another embodiment illustrative of the invention wherein one below-resonance frequency signal and two higher than resonance frequency signals are applied to the subscriber loop. It has been observed that the range of loop length usable with the subject ringing device counting arrangement is dependent on the selection of the above-resonance frequency signal. The use of a higher above-resonance frequency signal is preferred for shorter subscriber loop lengths, while the use of a lower above-resonance frequency signal is preferred for longer loop lengths. The ringing device resonance frequency generally used is 25 Hz. A below-resonance frequency signal of 5 Hz is sufficiently low to provide an accurate measure of the loop capacitance and the sum of the ringing device capacitance. An above-resonance frequency signal of 100 Hz is generally acceptable for the measurement of the loop capacitance. It has been determined, however, that an above-resonance frequency of 85 Hz provides better results for longer loop lengths, while an above-resonance frequency of 200 Hz provides satisfactory results for shorter loop lengths. The selection of the above-resonance frequency is determined by the value of admittance obtained at the higher above-resonance frequency. Thus, where the admittance at the higher above-resonance frequency exceeds a predetermined threshold, the lower above-resonance frequency signal is used. Where the predetermined threshold is not exceeded, the higher above-resonance frequency signal is used.

In FIG. 3, generator 301 provides the below-resonance frequency signal; generator 303 provides the low above-resonance frequency signal; and generator 305 provides the high above-resonance frequency signal. The outputs of generators 301, 303, and 305 are applied to summing circuit 320 via leads 307, 309, and 311, respectively. The output of summing circuit 320 is then applied to subscriber loop 330. At the other end of subscriber loop 330, subscriber ringing devices 340-1, 340-2 through 340-N are connected. Current sensor 350 is connected in series with subscriber loop. The output of current sensor 350 corresponds to the current through the loop responsive to the sum of the three frequency signals applied thereto. The output of the current sensor has a below-resonance frequency component and two above-resonance frequency components. These frequency components are separated in bandpass filters 360, 370, and 380. Bandpass filter 360 passes the below-resonance frequency signal from current sensor 350 but rejects the two above-resonance frequency components. Bandpass filter 370 is adapted to pass the frequency component derived from the low above-resonance frequency responsive to the output of generator 303 but rejects the frequency components resulting from generators 301 and 305. Bandpass filter 380 is selected to pass the high above-resonance frequency output of current sensor 350 responsive to the frequency signal applied from generator 305 and rejects the other two frequency component outputs of sensor 350.

AC-DC converter 362, which may comprise any of the well-known rectification arrangements known in the art, provides a DC signal proportional to the output of bandpass filter 360. This DC signal corresponds to the admittance measured at the below-resonance frequency and is a measure of the loop capacitance and the sum of the ringing device capacitances. In like fashion, converter 372 provides a DC signal corresponding to the low above-resonance frequency component of the detected current, and converter 382 provides a DC signal proportional to the high above-resonance output of bandpass filter 380. The output of converter 362 is applied to one input of difference circuit 390. The output of converter circuit 382 is applied to attenuator 384 which operates to scale the high above-resonance frequency result in accordance with Equation (3). Similarly, attenuator 374 scales the low above-resonance frequency result obtained from converter 372.

The output of attenuator 384 is applied to threshold detector 392 wherein it is compared to a predetermined level. Threshold detector 392 controls switch 394, which switch selectively applies the output of one of attenuators 374 and 384 to the other input of circuit 390. When the output of attenuator 384 exceeds the predetermined level set in threshold detector 392, switch 394 connects the output of attenuator 374 to difference circuit 390 as shown in FIG. 3. When the output of attenuator 384 is below the predetermined level set in detector 392, switch 394 connects the output of attenuator 384 to the input of difference circuit 390. The output of converter circuit 362 corresponds to the sum of the loop capacitance and capacitances of the ringing device connected to the subscriber loop under test. The other input of difference circuit 390 has applied thereto a signal corresponding to the loop capacitance of the subscriber loop under test whereby the output of difference circuit 390 is proportional to the number of ringing devices connected to subscriber loop 330. Difference circuit 390 may comprise an operational amplifier well known in the art arranged to scale the resultant differences to a convenient level.

It is to be understood that the ringing device counting arrangements of FIGS. 2 and 3 may be located at a convenient point in the communication network so that a large number of subscriber loops may be tested and a test trunk may be added to the loop. The testing arrangement can be combined with an automatic arrangement that successively tests subscriber loops on a predetermined list. For each loop, the circuit of FIG. 2 or FIG. 3 obtains the number of ringing devices connected to the subscriber loop under test and compares the measured number of ringing devices with the equipment assigned to the subscriber loop. The next subscriber loop on the list can then be tested. In this manner, a large number of loops can be tested in a relatively short period of time.

What is claimed is:

1. A circuit for counting ringing devices connected to a communication loop comprising first means for generating a first frequency signal; second means for generating a second frequency signal; means for coupling said first and second frequency signals to said communication loop, each ringing device comprising a resonance circuit having a resonance frequency intermediate said first and second frequencies; means connected to said communication loop for detecting a resultant communication loop signal responsive to said coupled first and second frequency signals having first and second frequency components; means for separating said resultant first frequency component from said resultant second frequency component; means connected to said separating means for producing a third signal corresponding to said separated first frequency component and for producing a fourth signal corresponding to said separated second frequency component; and means for subtracting said fourth signal from said third signal, the output of said subtracting means corresponding to the number of ringing devices connected to said communication loop.

2. A circuit for counting ringing devices connected to a communication loop according to claim 1 wherein said separating means comprises a first filter for passing only said first frequency component and a second filter for passing only said second frequency component.

3. A circuit for counting ringing devices connected to a communication loop according to claim 2 wherein said third signal producing means comprises means connected to said first filter for producing a DC signal corresponding to said separated first frequency component and said fourth signal producing means comprises means connected to said second filter for producing a DC signal corresponding to said separated second frequency component.

4. A circuit for counting ringing devices connected to a communication loop according to claim 3 wherein said subtracting means comprises a difference amplifier having a first input connected to said third signal producing means and a second input connected to said fourth signal producing means, said amplifier being operative to produce an output signal proportional to the difference between said third and fourth signals.

5. A circuit for counting ringing devices connected to a communication loop according to claim 4 wherein said coupling means comprises means connected to said first and second generating means for summing said first and second frequency signals.

6. A circuit for counting the number of ringing devices connected to a telephone subscriber loop wherein each ringing device comprises a series resonance circuit having a fixed resonant frequency comprising means for generating first and second frequency signals, said first frequency being below said resonant frequency and said second frequency being above said resonant frequency; means for applying said first and second frequency signals to said subscriber loop; means connected to said subscriber loop responsive to said applied first and second frequency signals for sensing the resultant loop current, said sensed loop current including said first and second frequency components; a first bandpass filter connected to said sensing means for passing said first frequency component; a second bandpass filter connected to said sensing means for passing said second frequency component; means connected to said first bandpass filter for converting said passed first frequency component to a first DC signal proportional thereto; means connected to said second bandpass filter for converting said passed second frequency component to a second DC signal proportional thereto; and means for subtracting said second DC signal from said first DC signal, the output of said subtracting means being proportional to the number of ringing devices connected to said subscriber loop.

7. A circuit for counting the number of ringing devices connected to a communication loop wherein each ringing device comprises a series resonance circuit having a fixed resonant frequency, said circuit comprising means for generating a below-resonance frequency signal; means for generating a first above-resonance frequency signal; means for geneating a second above-resonance frequency signal; means for applying said below-resonance and said first and second above-resonance frequency signals to said communication loop; means connected to said loop for detecting a resultant signal responsive to said applied signals having a below-resonance frequency component and first and second above-resonance frequency components; means for separating said below-resonance frequency component and said first and second above-resonance frequency components; means responsive to said separated below-resonance component for producing a first signal corresponding to said separated below-resonance frequency component; means for producing a second signal corresponding to said separated first above-resonance frequency component; means for producing a third signal corresponding to said separated second above-resonance frequency component; means for comparing said third signal with a predetermined reference signal; means responsive to said third signal exceeding said predetermined reference signal for subtracting said second signal from said first signal; and means responsive to said third signal being equal to or less than said predetermined level signal for subtracting said third signal from said first signal.

8. A method for counting the number of resonant circuit ringing devices connected to a communication line, each ringing device having a predetermined resonance frequency, comprising the steps of (1) generating a below-resonance frequency signal; (2) generating an above-resonance frequency signal; (3) applying said below- and above-resonance frequency signals to said communication line; (4) sensing the communication line current resulting from said applied below- and above-resonance frequency signals, said communication line current comprising below- and above-resonance frequency components; (5) separating said below-resonance frequency component from said above-resonance frequency component; (6) producing a third signal corresponding to said below-resonance frequency component; (7) producing a fourth signal corresponding to said above-resonance frequency component; and (8) subtracting said fourth signal from said third signal.

9. A method for counting the number of resonant circuit ringing devices connected to a communication line, each ringing device having a predetermined resonance frequency, comprising the steps of (1) generating a below-resonance frequency signal; (2) generating a first above-resonance frequency signal; (3) generating a second above-resonance frequency signal; (4) applying said below-resonance frequency signal and said first and second above-resonance frequency signals to said communication line; (5) sensing the communication line current responsive to said below-resonance and said first and second above-resonance frequency signals, said communication line current comprising a below-resonance frequency component and first and second above-resonance frequency components; (6) producing a third signal corresponding to said below-resonance frequency component; (7) producing a fourth signal corresponding to said first above-resonance frequency component; (8) producing a fifth signal corresponding to said second above-resonance frequency component; (9) comparing said fifth signal to a predetermined threshold value; (10) subtracting said fourth signal from said third signal responsive to said fifth signal being greater than said predetermined threshold value; and (11) subtracting said fifth signal from said third signal responsive to said fifth signal being equal to or less than said predetermined threshold value.

* * * * *